US005106448A

United States Patent [19]

Freeman et al.

[11] Patent Number: 5,106,448

[45] Date of Patent: Apr. 21, 1992

[54] LABEL PRINTING AND SEPARATING APPARATUS AND METHOD

[76] Inventors: Gerald C. Freeman, 185 W. Norwalk Rd., Norwalk, Conn. 06850; John J. Balogh, Jr., 215 Rocky Hill Rd., Trumbull, Conn. 06611

[21] Appl. No.: 632,216

[22] Filed: Dec. 21, 1990

[51] Int. Cl.[5] .............................................. B32B 31/00

[52] U.S. Cl. ..................................... 156/361; 156/584

[58] Field of Search ............... 156/384, 360, 361, 584, 156/363

[56] References Cited

U.S. PATENT DOCUMENTS 4,276,112 6/1981 French et al. ........................ 156/360

4,944,827 7/1990 Lilly et al. .......................... 156/384

*Primary Examiner*—David A. Simmons

*Assistant Examiner*—Robert Barker

*Attorney, Agent, or Firm*—Robert H. Whisker; Melvin J. Scolnick; David E. Pitchenik

[57] ABSTRACT

A label printing system prints information on a series of labels carried on a web of release liner. The system includes a data processor and a printer. The printer includes a print head, a mechanism for advancing the web, a mechanism for reversing the web, and a mechanism for separating the labels from the release liner as the web advances. The data processor controls the printer to reverse the web until one of the labels is aligned with the print head, print information on the label, and then advance the web for separation of the printed label from the release liner.

4 Claims, 6 Drawing Sheets

LABEL PRINTING AND SEPARATING APPARATUS AND METHOD

FIELD OF THE INVENTION

The subject invention relates to label printers. More particularly it relates to label printers that include a mechanism for separating labels from a continuous web of release liner.

RELATED APPLICATION

The disclosure of copending patent application Ser. No. 631,527, filed Dec. 21, 1990, assigned to the assignee of this application, is incorporated herein by reference.

BACKGROUND OF THE INVENTION

The disclosure of U.S. Pat. No. 4,944,827, entitled "LABEL PRINTING SYSTEM FOR A COMPUTER OUTPUT LINE PRINTER", issued to Norman R. Lilly, et al., and assigned to the assignee of this application, is incorporated herein by reference. Said U.S. Pat. No. 4,944,827 discloses a computer output printer with a bail rod. Attached to the bail rod is a separator rod that defines a path of travel for a web of release liner to which labels are affixed in a regular pattern. The web's path of travel runs past a print head which prints information on the label and then on to a separation edge defined by the separator rod. At the separation edge there is an angle in the path of travel. The angle is sufficiently large to cause the labels, which are stiffer than the liner, to separate from the liner. The label printing system of U.S. Pat. No. 4,944,827 has been found to be quite useful and efficient, particularly as part of parcel processing systems.

In the label printing system of U.S. Pat. No. 4,944,827, a label must be advanced some distance beyond the print head to the separation edge in order to obtain separation of the label. As proposed in that patent, each label has an initial field in which fixed information is printed and second field in which variable information is printed. A label printing cycle includes printing variable information on a label upon which fixed information had previously been printed, advancing the label to and past the separation edge, and printing the fixed information on the next label while the first label is advanced for separation. As stated in that patent, if all the information to be printed is variable, the pitch, or distance separating successive labels, must be increased, so that after separation of the first label, the initial portion of the next label is aligned with the print head.

Referring to FIG. 1 of the present application, there are shown webs 10, 10'. Labels 12 on web 10 are rather closely spaced with a pitch P. On web 10' the pitch of labels 12 is P', much greater than P. Web 10 is of the sort that may be used with the system of U.S. Pat. No. 4,944,827 when some of the information to be printed on label is fixed. However, where all of the information is variable, web 10' or the like must be used in the system of U.S. Pat. No. 4,944,827. As will be appreciated by those skilled in the art, the cost per label of web 10' is much greater than that of web 10'. Accordingly, it would be a desirable improvement if a label printing system were capable of printing variable information on all of the area of the labels 12 of web 10.

SUMMARY OF THE INVENTION

According to one aspect of the invention, a label printing system includes a data processor for sequentially generating information to be printed on a series of labels carried on a web of release liner, and a printer connected to and responsive to the data processor for printing the information on the labels. The printer includes a print head, a mechanism for advancing the web, a mechanism for reversing the web and a separator mechanism for separating the labels from the release liner as the web advances. The data processor controls the printer to: (i) reverse the web until one of the labels is aligned with the print head; (ii) print information on the label, and (iii) advance the web for separation of the printed label from the release liner.

According to another aspect of the invention, an apparatus for separating labels from a web of release liner includes a pair of bars for defining a label release path, and structure for mounting the bars. The bars are mounted in the structure so that at least one of the bars is movable, relative to the other bar, between a first position in which the bars define the label release path and a second position in which a gap is formed between the bars to facilitate threading of the web between the bars.

In accordance with a further aspect of the invention, the mounting structure includes a j-shaped slot in which one of the bars is movable.

DETAILED DESCRIPTION OF THE PREFERRED EMBODIMENTS

Figure 1:
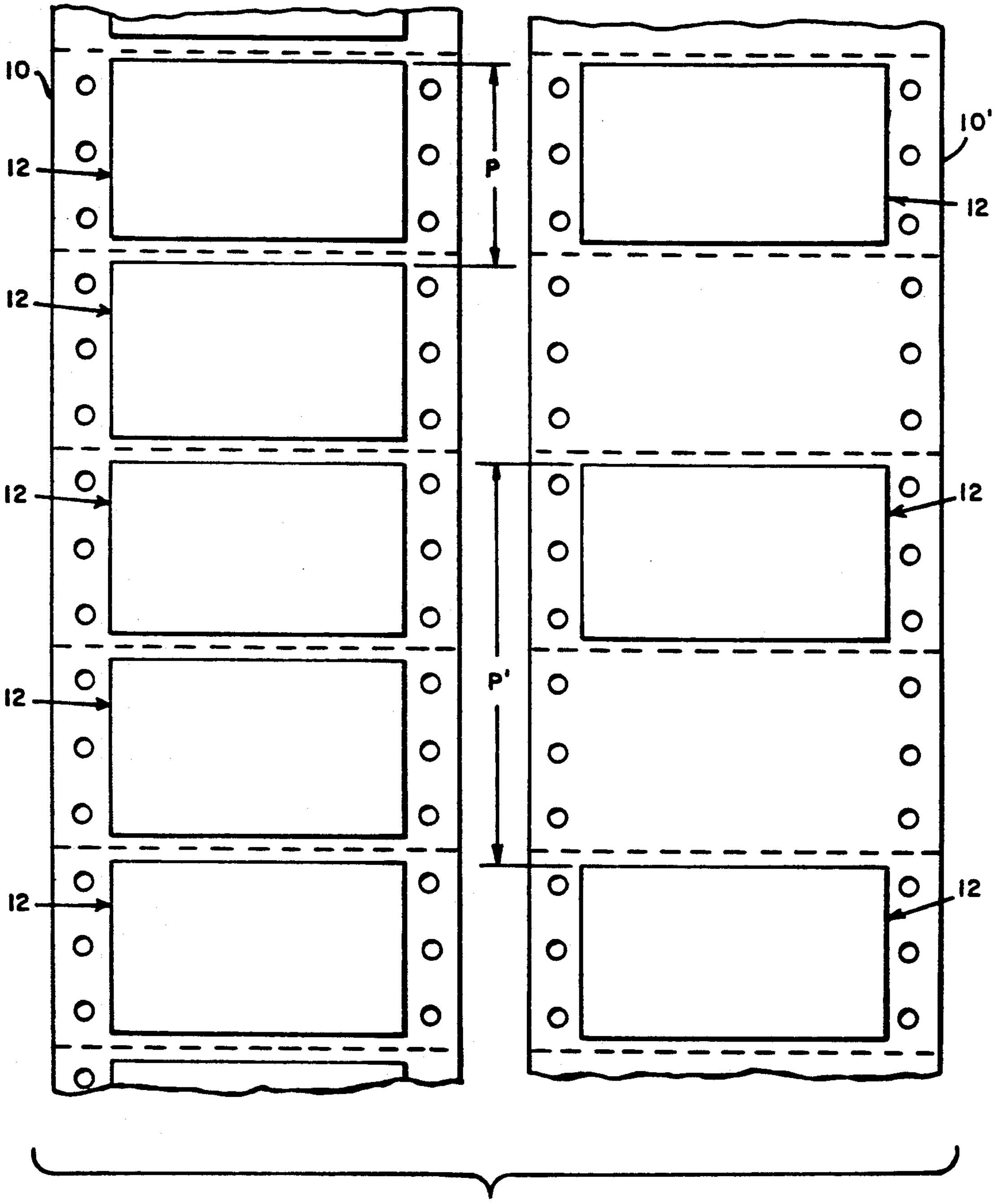
FIG. 1 (PRIOR ART)
FIG. 1 shows two label-bearing webs used with prior art label-printing systems.
Figure 2:
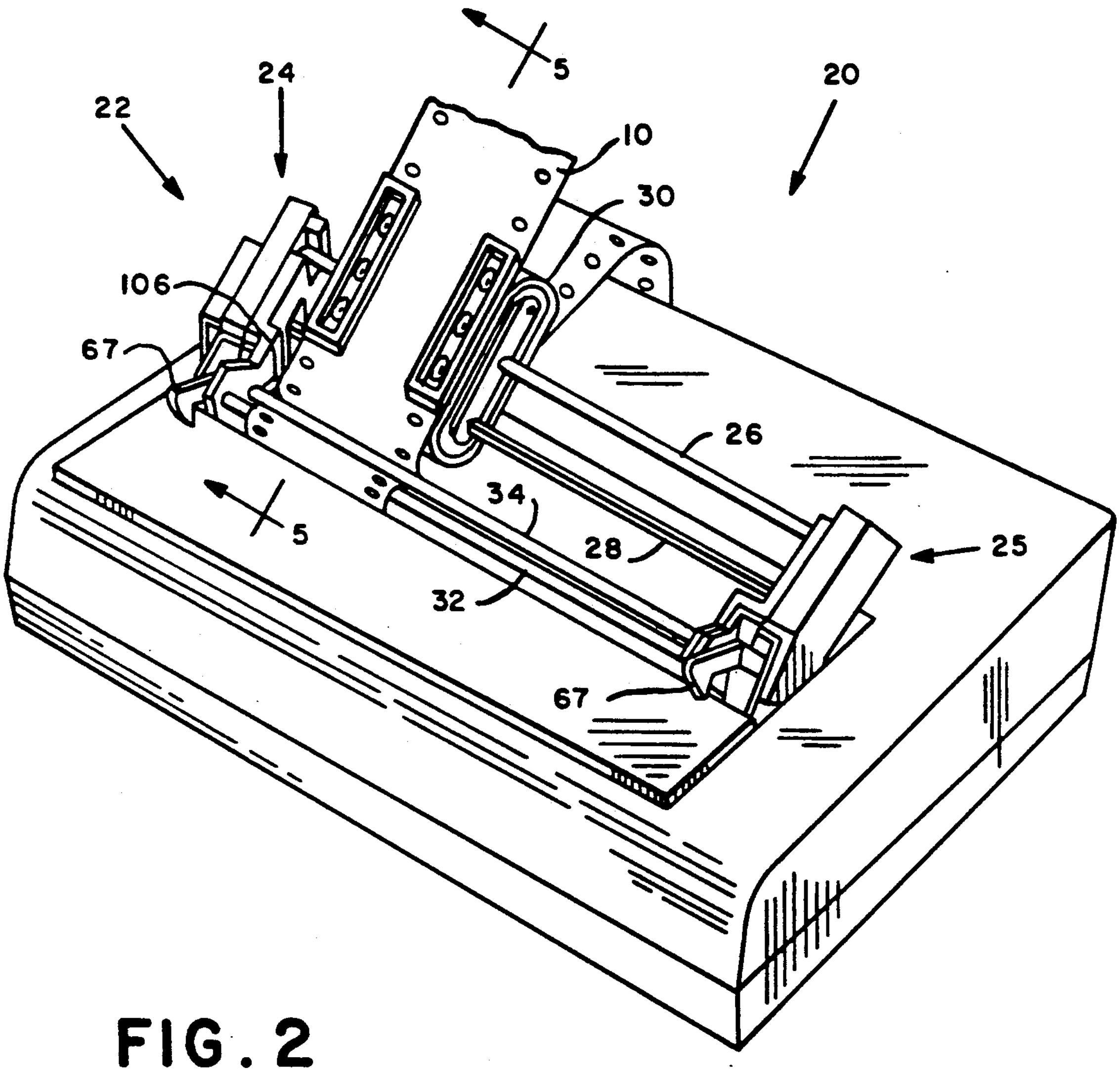
FIG. 2 shows a perspective view of a printer that is part of a label printing system in accordance with the subject invention.

Referring to FIG. 2, printer 20 is a computer output printer. Printer 20 may be adapted from a conventional computer output printer, such as a model M-1809 line printer available from Brother International Corporation, Somerset, NJ. In addition to its conventional elements, printer 20 includes separator assembly 22. Preferably assembly 22 is easily attachable to, and detachable from, printer 20.

Assembly 22 includes oppositely disposed support members 24, 25. Mounted in members 24, 25 and extending therebetween are crossbars 26, 28. Bar 26 is fixedly mounted and bar 28 is mounted for rotation around its longitudinal axis. Bars 26, 28 support a conventional pull tractor 30.

Also mounted in support members 24, 25 are separator bar 32 and guide bar 34. Preferably, bars 32, 34 are both mounted for rotation about their longitudinal axes and are round in cross-section.

Continuous web 10 is shown threaded into printer 20. Web 10 passes between bars 32, 34 and is engaged by pull tractor 30.

Figure 3B:
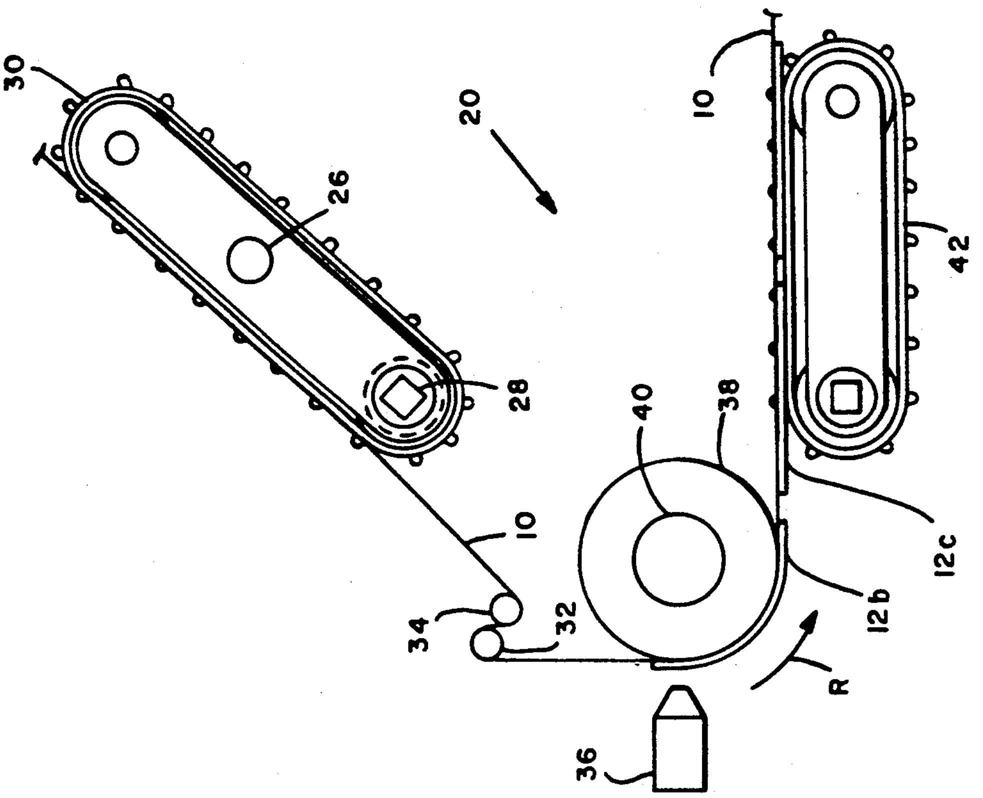
FIG. 3(*a*), 3(*b*) show schematic drawings of the web path through the printer of FIG. 2.
Figure 3A:
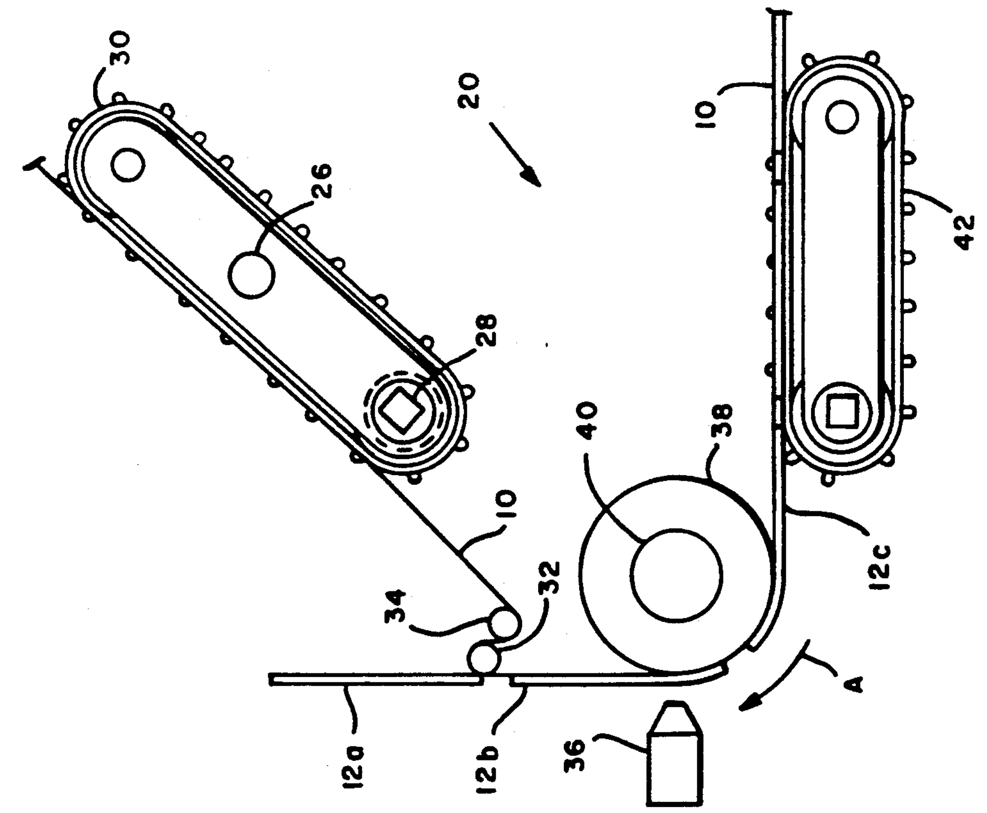

Reference is now also made to FIGS. 3(*a*), 3(*b*), which illustrate in schematic form the path of web 10 through printer 20 as well as further components of printer 20. Printer 20 includes conventional print head 36 for printing on labels or other items, and conventional platen roller 38, mounted on platen shaft 40 for rotation therewith. Printer 20 also includes conventional push tractor 42 that engages web 10.

As discussed in said U.S. Pat. No. 4,944,827, printer 20 is connected to, and operates under control by, a data processing system (not shown). Such a data processing system may be a STAR 110 parcel processing system, or a STAR 200 parcel processing system, both available from Pitney Bowes Inc., Stamford, CT.

Printer 20 is operable, under control of said data processing system, to advance web 10 in a direction A as shown in FIG. 3(*a*). Printer 20 is also operable, again under control of said data processing system, to reverse web 10, causing it to move in a direction R as shown in FIG. 3(*b*). As will be well understood by those skilled in the art, platen roller 38 and push tractor 42 are driven by conventional means (not shown) so as either to advance or reverse web 10. Pull tractor 30 is preferably driven only to advance web 10. Pull tractor 30 is conveniently driven in common with platen roller 38 by conventional means such as a series of gears (not shown) connecting bar 28 with platen shaft 40. Preferably the pull tractor driving means includes a one-way clutch or the like so that pull tractor 30 does not drive web 10 in reverse.

As seen in FIGS. 3(*a*), 3(*b*), a series of labels, including labels 12*a*, 12*b*, 12*c*, are carried on web 10. As web 10 is advanced, it passes partially around separator bar 32, between bars 32, 34, and then partially around guide bar 34 on its way to pull tractor 30. The relative positions of platen roller 38, bars 32, 34 and pull tractor 30 are preferably such that the path of web 10 includes a change of direction of approximately 180° or more around the circumference of separator bar 32. The labels carried on web 10 are relatively stiff as compared to web 10 and separate from web 10 as web 10 passes around separator bar 32, which thus defines a separation edge. The 180° change of direction, together with a separator bar 32 having a diameter in cross section of about 5 mm, has been found to provide very effective separation of labels from web 10. The tension applied to web 10 by pull tractor 30 is also important in causing separation of the labels from web 10.

A label printing cycle according to the subject invention, including separation of a printed label from web 10, is discussed by reference to FIGS. 3(*a*), 3(*b*) and the flow chart shown on FIG. 4.

In FIG. 3(*a*), label 12*a* is shown in its position at the end of a print cycle. It will be understood that label 12*a* has previously been advanced line-by-line past print head 36 for printing of information on label 12*a* and then has been advanced further, to its position shown in FIG. 3(*a*). Label 12*a* is now almost completely separated from web 10, with only its trailing edge, adjacent separator bar 32, still attached to web 10. Label 12*a* may now easily be removed from web 10 by an operator of the system and, e.g., applied to a parcel processed for shipment by the system.

Assuming now that label 12*a* has been removed from web 10, FIG. 3(*a*) illustrates the position of label 12*b* immediately before commencement of its printing cycle. It will be understood that label 12*b* is the label carried on web 10 immediately after, and separated by a short distance from, label 12*a*. It will also be noted that a large portion of label 12*b* has been advanced past print head 36.

Typically, the printing cycle for label 12*b* will be initiated by the system operator pressing a "print" key of the data processing system upon completion of a parcel processing transaction. In the first step of the printing cycle (step 50 of FIG. 4), web 10 is driven in reverse (indicated by direction R of FIG. 3(*b*)), until label 12(*b*) reaches approximately the position shown for it in FIG. 3(*b*). Next follows step 52, during which web 10 is advanced (in direction A of FIG. 3(*a*)) as information generated by the data processor is printed line-by-line on label 12*b* by print head 36. The information may, for instance, be such as is required for a shipping label for the parcel processed in the aforesaid transaction.

On completion of step 52, step 54 follows, in which web 10 is further advanced in direction A until label 12*b* reaches the position shown for label 12*a* in FIG. 3(*a*). It will be recognized that web 10 has at this point advanced sufficiently for separation of label 12*b*. Preferably the routine of FIG. 4 now ends, with the system pausing to allow the operator to remove label 12*b*, and to, e.g., apply it to the parcel just processed. It will be recognized that label 12*c*, which follows label 12*b* on web 10, now occupies the position shown for label 12*b* in FIG. 3(*a*). The system is now available for the operator to process another parcel and to initiate a printing cycle for label 12*c*.

Those skilled in the art will understand that the information printed on labels 12*b*, etc. can be entirely 10 variable, and need not, as in said U.S. Pat. No. 4,944,827, be fixed as to the initial lines to be printed. It will further be understood that the system of this invention is also useful for printing labels when the fixed information is printed last, with variable information printed in the first line or lines of the label. Of course, the system of this invention can also be used for printing fixed information on labels.

Another aspect of the subject invention is discussed by reference to FIGS. 5(*a*), 5(*b*), 6(*a*), 6(*b*).

Figure 5:
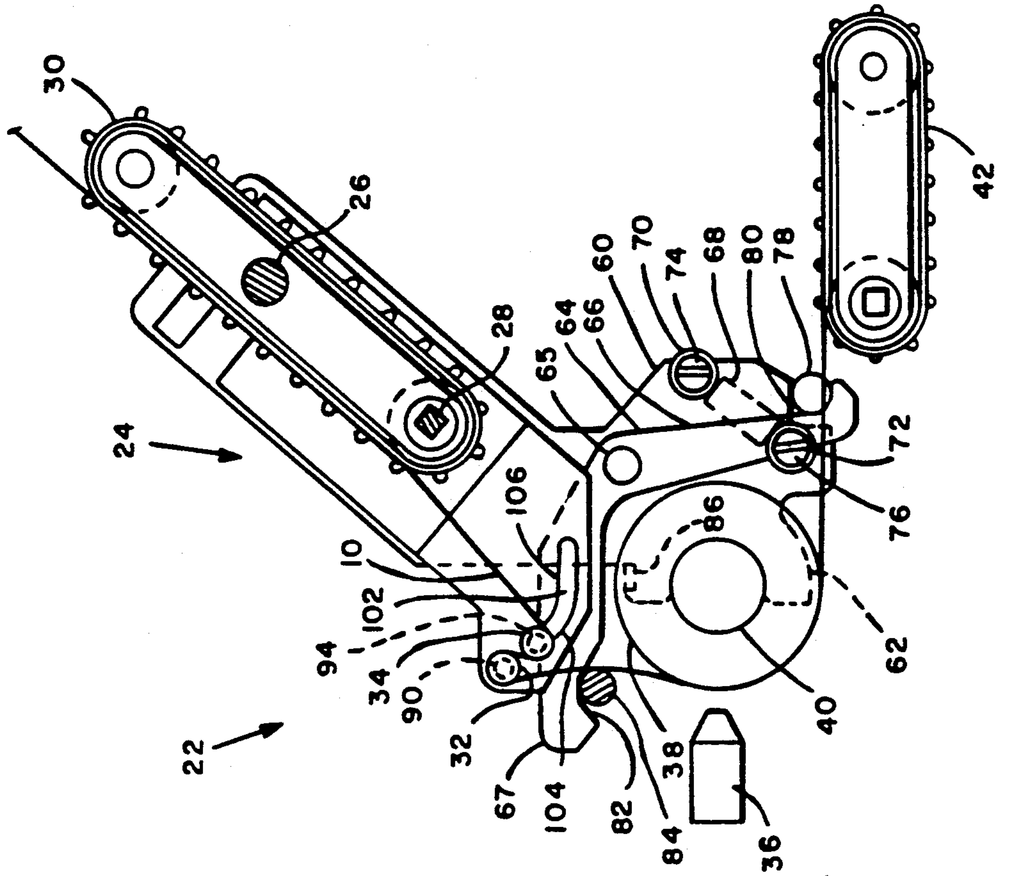
FIGS. 5(*a*), 5(*b*) show semi-schematic cross-sectional views taken on the line 5—5 of FIG. 2.
Figure 5:
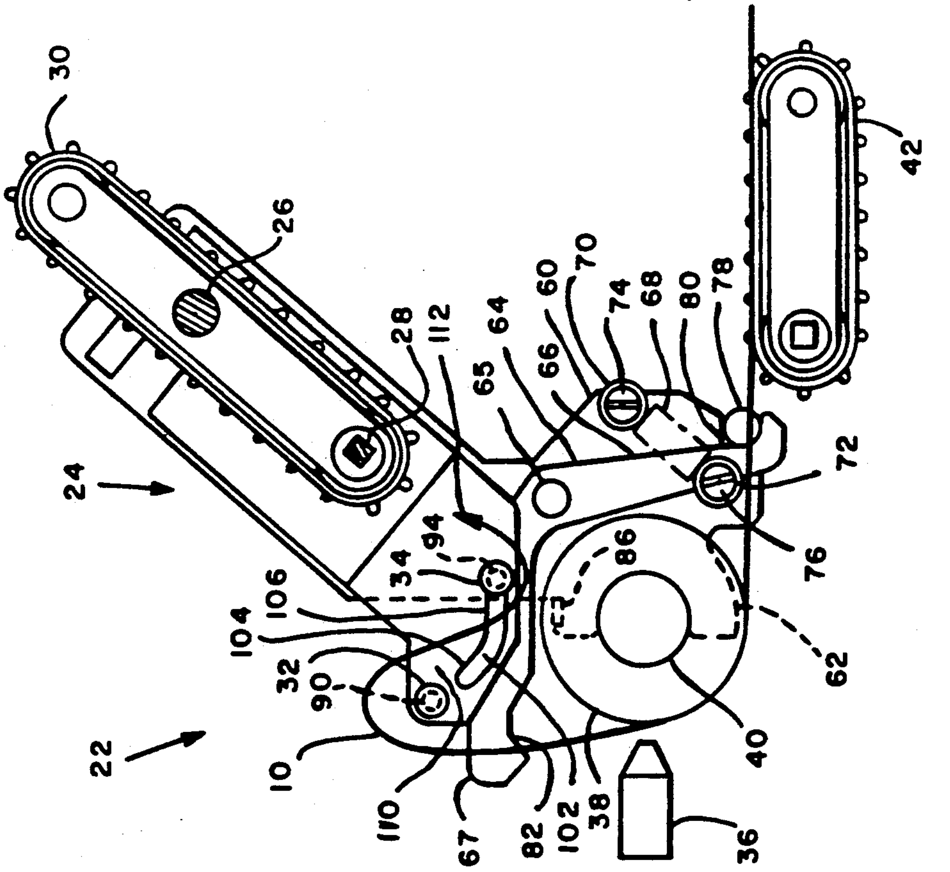

As seen in FIG. 5(*a*) or FIG. 5(*b*), support member 24 includes bracket 60 which has an arcuate portion 62 that fits partially around platen shaft 40 of printer 20 (FIG. 2) and aids in the mounting of separator assembly 22 on printer 20. A pivot arm 64 is pivotally mounted on bracket 60 by means of pivot 65. Pivot arm 64 includes mounting finger 66 and detent latch 67. Coil spring 68 has end rings 70, 72, by which it is respectively secured to pin 74 of bracket 60 and pin 76 of finger 66. Spring 68 biases arm 64 to pivot in a counterclockwise direction about pivot 65 and causes finger 66 to hold a shaft 78 of printer 20 in notch 80 of bracket 60. It will be seen that arcuate portion 62, notch 80 and spring-biased finger 66 cooperate to secure member 24 to shafts 40, 78 of printer 20.

Detent latch 67 includes a notch 82 which restrains conventional spring biased bail bar 84 (shown only in FIG. 5(*b*)) of printer 20. In the absence of the restraining action of latch 67, the tension in web 10 imparted by pull tractor 30 would tend to force bail bar 84 away from platen roller 38, resulting in possible deterioration in print quality. Latch 67 preferably includes a tab (not shown) by which the system operator may readily cause pivot arm 64 to pivot in a clockwise direction to aid in detachment of assembly 22 from, or attachment of assembly 22 to, printer 20. Bracket 60 also has abutment pin 86 which limits counter clockwise pivoting of arm 64 when assembly 22 is detached from printer 20.

Mounting of bars 32, 34 in support members 24, 25, as well as threading of web 10 into assembly 22, will now be discussed in detail. Bars 32, 34 are generally cylindrical, and both have cylindrical ends that have a smaller diameter than the main portions of bars 32, 34. Reference numerals 90, 92, 94, 96 respectively refer to the four ends of bar 32, 34.

Member 24 includes cylindrical hole 98 and member 25 includes cylindrical hole 100. The diameters of holes 98, 100 are slightly larger than the diameters of ends 90, 92 of bar 32. Ends 90, 92 are respectively held in holes 98, 100 so that bar 32 is mounted in members 24, 25 for rotation about the longitudinal axis of bar 32. Except for that rotation, the position of bar 32 is essentially stationary with respect to members 24, 25.

Member 24 also includes "J"-shaped slot 102 that includes a arcuate portion 104 proximate to hole 98 and a straight portion 106 away from hole 98. The width of slot 102 is slightly larger than the diameter of end 94 of bar 34.

Member 25 has a hole 108 that is proximate to hole 100. Hole 108 has a portion cylindrical and another portion that flares outward and away from member 24. The cylindrical portion of hole 108 is slightly larger in diameter than end 96 of bar 108.

End 94 is slidably held in slot 102 and end 96 is pivotally held in flared hole 108, so that bar 34 pivots about hole 108 as end 94 slides in slot 102.

Figure 6A:
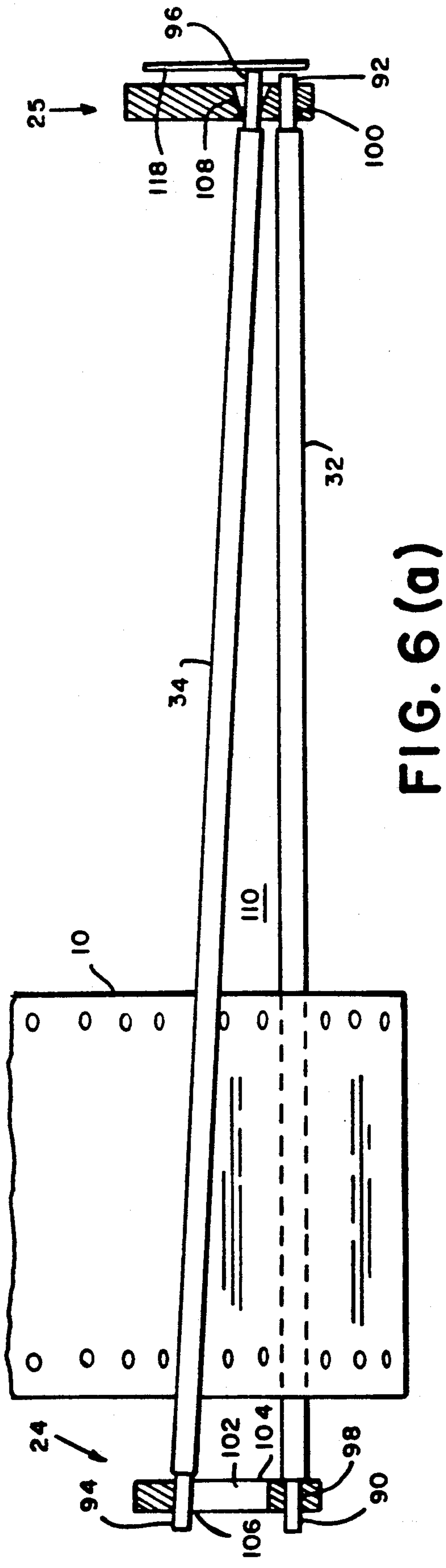
FIGS. 6(*a*), 6(*b*) are semi-schematic views of a label separating apparatus in accordance with the invention.
Figure 6B:
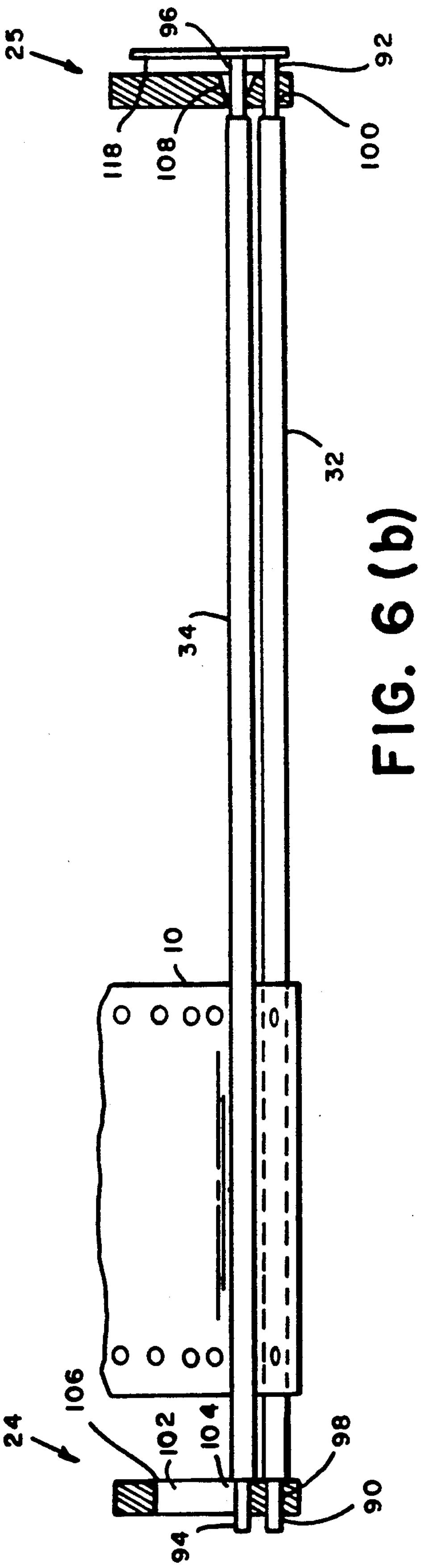

When it is desired to thread web 10 through printer 20 and assembly 22, web 10 is first fed into printer 20 so that it is engaged by push tractor 42. Printer 20 is then operated to advance web 10 around and past platen roller 40 and sufficiently beyond stationary separator bar 32 so that a leader portion of web 10 is available for threading through assembly 22. The operator then slides end 94 of guide bar 34 in slot 102 of member 24 until, as shown in FIG. 5(*a*), end 94 is in portion 106 of slot 102, and preferably is as far as possible from end 90 of bar 32. As best seen in FIG. 6(*a*), there is now formed a gap 110 between bars 32, 34.

As indicated by arrow 112 in FIG. 5(*a*), the operator then threads web 10 through gap 110, and between bars 32, 34. Web 10 is next inserted into pull tractor 30. After web 10 is engaged by tractor 30, the operator manually drives tractor 30 to advance web 10, thereby removing slack in web 10. As the slack is removed, the resulting tension in web 10 forces end 94 to slide in slot 102 toward portion 104. After all of the slack in web 10 is removed, end 94 of bar 34 is forced into the position shown in FIGS. 5(*b*), 6(*b*), so that bars 32, 34 are parallel and proximate. Bars 32, 34 now define the label release path illustrated in FIGS. 3(*a*), 3(*b*), 5(*b*). It will be appreciated that during normal operation of printer 2 and assembly 22 with web 10 threaded therethrough, considerable tension is maintained on web 10 by pull tractor 30, and that tension is sufficient to hold guide bar 34 in the position of FIGS. 5(*b*), 6(*b*), although bar 34 remains free to rotate about its longitudinal axis as web 10 is advanced.

As will be appreciated by those skilled in the art, gap 110, formed when bars 32, 34 are in their position of FIG. 6(*a*) greatly facilitates threading of web 10 between bars 32, 34. If bars 32, 34 were fixed in their proximity of FIG. 6(*b*), it would be quite difficult and inconvenient to thread web 10 between them. Although in the embodiment described above, only end 94 of guide bar 34 is displaced to form gap 110 with end 96 remaining essentially fixed except for pivotal movement, it will be recognized that a slot similar to slot 102 could be provided in member 25 in place of hole 108, thereby allowing both ends 94, 96 of guide bar 34 to be displaced in order to form gap 110. Further, although in the above described embodiment separator bar 32 is substantially fixed, except for rotation, relative to member 24, 25, it will be recognized that separator bar 32 could be mounted for movement in member 24 and/or member 25, in which case guide bar 34 could, but need not, be substantially fixed, relative to members 24, 25.

Member 25, which has not been described in detail up to this point, is preferably a substantially mirror image of member 24, except for the difference as to slot 102 of member 24 vis-a-vis hole 108 of member 25. An additional difference is that member 24 includes a series of gears for driving shaft 28, as previously mentioned. Finally, member 25 preferably includes ground plate 118, which is preferably a conductive metal leaf spring mounted in member 25 so that plate 118 simultaneously contacts ends 92, 96 of bars 32, 34. As bars 32, 34 are preferably composed of a conductive metal, ground plate 118 serves to discharge electrostatic potential differences that are generated between bars 32, 34 as a result of passage of web 10 thereupon.

Figure 4:
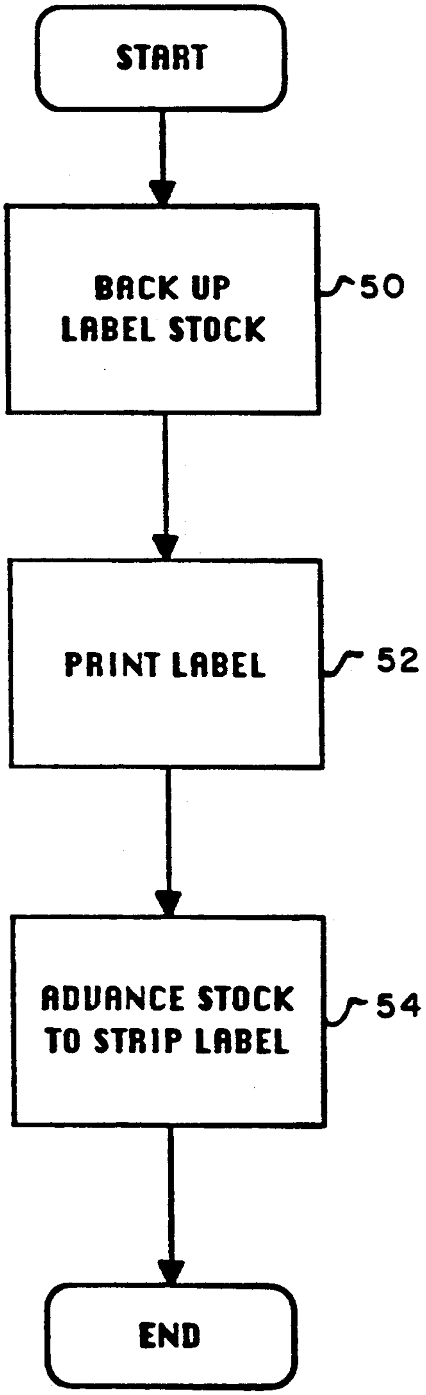
FIG. 4 shows a flow chart of a routine for operating a label printing system in accordance with the invention.

Although the preferred embodiment of the subject label printing system incorporates both the relatively movable separation path defining bars illustrated in FIGS. 5(*a*), 5(*b*), 6(*a*), 6(*b*) and the mechanism for producing the print cycle of FIG. 4, it will be recognized that these two features of the system may be used separately. Thus, an embodiment as described in connection with FIGS. 3(*a*), 3(*b*), and 4 could, for example, have a separation means in which bars 32, 34 were fixedly mounted in members 24, 25 or the separation means could comprise a knife edge or other structure for defining a separation path. Conversely, the relatively movable separation path defining bars of FIGS. 5(*a*), 5(*b*), 6(*a*), 6(*b*), could be used in a system that does not comprise means for reversing web 10 or is otherwise not capable of carrying out the print cycle illustrated in FIG. 4.

The above described embodiments have been provided by way of illustration only; other embodiments of the subject invention will be apparent to those skilled in the art from consideration of the above description and the attached drawings. Accordingly, limitations on the subject invention are to be found only in the claims set forth below.

What is claimed is:

1. A label printing system comprising:

(a) data processing means for sequentially generating information to be printed on a series of labels carried on web of release liner;

(b) a printer connected to and responsive to said data processing means for printing said information on said labels, said printer comprising a print head, means for advancing said web, means for reversing said web, and separator means for separating said labels from said release liner as said web advances; and means, associated with said data processing means, for initiating a print cycle;

said data processing means responding to actuation of said initiating means by controlling said printer to:

(i) commence said print cycle by reversing said web until one of said labels is aligned with said print head;

(ii) print information on said aligned label; and (iii) advance said web for separation of said printed label from said release liner; said print cycle ending with said separation of said label;

said separator means comprising a pair of bars for defining a label release path and means for mounting said bars, said bars being mounted in said mounting means so that at least one of said bars is movable, relative to the other bar, between a first position in which said bars define said label release path and a second position in which a gap is formed between said bars to facilitate threading of said web between said bars.

2. The label printing system of claim 1, wherein said separator means comprises an assembly that includes said pair of bars and said mounting means, said assembly being detachable from said printer.

3. The label printing system of claim 2, wherein said mounting means comprises a "J"-shaped slot, said at least one bar being held in said slot for sliding movement between said first position and said second position.

4. The label printing system of claim 1, wherein said mounting means comprises a "J"-shaped slot, said at least one bar being held in said slot for sliding movement between said first position and said second position.

* * * * *